United States Patent
Sadot et al.

(10) Patent No.: US 9,954,620 B2
(45) Date of Patent: Apr. 24, 2018

(54) ALL-OPTICAL SILICON-PHOTONIC CONSTELLATION CONVERSION OF AMPLITUDE-PHASE MODULATION FORMATS

(71) Applicants: B.G. NEGEV TECHNOLOGIES AND APPLICATIONS LTD., AT BEN-GURION UNIVERSITY, Beer Sheva (IL); BAR-ILAN UNIVERSITY, Ramat Gan (IL)

(72) Inventors: Dan Sadot, Kfar Bilu (IL); Zeev Zalevsky, Rosh HaAyin (IL); Tomer Yeminy, Ramat Gan (IL)

(73) Assignees: B.G. Negev Technologies and Applications Ltd., at Ben-Gurion University, Beer Sheva (IL); Bar Ilan University, Ramat Gan (IL)

( * ) Notice: Subject to any disclaimer, the term of this patent is extended or adjusted under 35 U.S.C. 154(b) by 0 days.

(21) Appl. No.: 15/514,762

(22) PCT Filed: Oct. 1, 2015

(86) PCT No.: PCT/IL2015/050984
§ 371 (c)(1),
(2) Date: Mar. 27, 2017

(87) PCT Pub. No.: WO2016/051410
PCT Pub. Date: Apr. 7, 2016

(65) Prior Publication Data
US 2017/0222729 A1    Aug. 3, 2017

Related U.S. Application Data

(60) Provisional application No. 62/058,689, filed on Oct. 2, 2014.

(51) Int. Cl.
*H04B 10/61* (2013.01)
*H04B 10/516* (2013.01)
(Continued)

(52) U.S. Cl.
CPC ....... *H04B 10/615* (2013.01); *H04B 10/5161* (2013.01); *H04B 10/541* (2013.01);
(Continued)

(58) Field of Classification Search
CPC .............. H04B 10/615; H04B 10/5161; H04B 10/541; H04B 10/5561; H04B 10/612; H04B 2210/516; H04L 25/03165
(Continued)

(56) References Cited

U.S. PATENT DOCUMENTS 9,515,745 B2 * 12/2016 Bosco ................ H04B 10/6162
2011/0002696 A1    1/2011 Kang
(Continued)

OTHER PUBLICATIONS

Modulation format conversion in future optical networks, Adalid, Master Thesis Technical University of Denmark, Mar. 31, 2009 (111 pages).
(Continued)

*Primary Examiner* — Dalzid Singh
(74) *Attorney, Agent, or Firm* — Roach Brown McCarthy & Gruber, P.C.; Kevin D. McCarthy

(57) ABSTRACT

A method for performing optical constellation conversion, according to which each received symbol from a constellation of input symbols is optically split into M components and each component is multiplied by a first predetermined different complex weighing factor, to achieve M firstly weighted components with different amplitudes. Then a nonlinear processor optically performs a nonlinear transform on each M firstly weighted components, so as to obtain M outputs which are linearly independent, Finally, a linear
(Continued)

processor optically performs a linear transform to obtain a new converted constellation by optically multiplying, in the complex plane, each of the M outputs by a second predetermined different complex weighing factor, to achieve M secondly weighted components and then summing the M secondly weighted components.

12 Claims, 8 Drawing Sheets

(51) Int. Cl.
    *H04B 10/54*     (2013.01)
    *H04B 10/556*     (2013.01)
    *H04L 25/03*     (2006.01)

(52) U.S. Cl.
    CPC ... *H04B 10/5561* (2013.01); *H04L 25/03165* (2013.01); *H04B 10/612* (2013.01); *H04B 2210/516* (2013.01)

(58) Field of Classification Search
    USPC .......................................... 398/210
    See application file for complete search history.

(56) References Cited

U.S. PATENT DOCUMENTS

2013/0054500 A1* 2/2013 Al-Duwaish ........ G05B 13/027
    706/19
2013/0077979 A1 3/2013 Dou et al.
2013/0308960 A1* 11/2013 Horikoshi .......... H03H 21/0012
    398/209
2013/0330070 A1* 12/2013 Yu ...................... H04B 10/2507
    398/16
2014/0219666 A1* 8/2014 Tselniker .......... H04L 25/03019
    398/208

OTHER PUBLICATIONS

"RBF networks-based nonlinear principal component analysis for process fault detection". Zheng et al. In machine learning and cybernetics. vol. 8, pp. 4784-4788. Aug. 21, 2005 (7 pages).

"Universal approximation using radial basis function networks," J. Park and I.W. Sandberg, Neural Computation, vol. 3, No. 2, pp. 246-257, Jun. 1991 (12 pages).

"Approximation and radial basis function Networks,", J. Park and I.W. Sandberg, Neural Computation, vol. 5, No. 2, pp. 305-316, Mar. 1993 (12 pages).

"Multivariable functional interpolation and adaptive networks," D. S. Broomhead and D. Lowe, Complex Systems, vol. 2, pp. 321-355, 1988 (35 pages).

All Optical Signal Processing. Lightwave Tech. Journal 32 No. 4 2014 660-680; Jan. 10, 2014 (2 pages).

International Search Report for PCT/IL2015/050984, dated Dec. 30, 2015; 4 pages.

Written Opinion of the International Searching Authority for PCT/IL2015/050984, dated Dec. 30, 2015; 4 pages.

* cited by examiner (a)

(b)

ALL-OPTICAL SILICON-PHOTONIC CONSTELLATION CONVERSION OF AMPLITUDE-PHASE MODULATION FORMATS

FIELD OF THE INVENTION

The present invention relates to the field of optical communication systems. More particularly, the invention relates to a system for the conversion of constellation of amplitude-phase modulation formats.

BACKGROUND OF THE INVENTION

Optical communication networks use a constellation diagram for the representation of a signal modulated by a digital modulation scheme such as quadrature amplitude modulation or phase-shift keying. The signal is represented as a two-dimensional diagram in the complex (I-Q) plane, where the possible symbols that may be selected by a given modulation scheme are represented as points (symbols) in the complex plane. In many cases, a constellation at the transmitting side must be converted to a corresponding constellation at the received side, in order to reconstruct the transmitted data. For example, if the transmitting side uses QPSK modulation scheme and the receiving side uses 8-PSK scheme, the QPSK constellation must be converted (mapped) to symbols in the 8-PSK scheme.

Such communication networks passed a significant breakthrough with the deployment of Erbium-Doped Fiber Amplifiers (EDFAs), which enabled all-optical amplification of transmitted signals. The all-optical amplification makes it possible to avoid electrical regenerators which employ Optical-Electrical-Optical (OEO) conversions for signal recovery. This is significant as OEO conversions require expensive high speed electronics, which becomes a limiting bottleneck in high transmission rates. In addition, OEO conversions require complex implementation as the optical signal should be detected, recovered, and re-transmitted. Since the development of the EDFAs, the field of all-optical signal processing has widely evolved, mainly due to the enabling technologies of photonic integrated circuits as well as highly nonlinear materials and devices. Consequently, all-optical devices have been developed to perform various operations such as optical switching, equalization, and application of logic functions. Another major advance in the evolution of optical communications is the development of coherent optical communication systems. These systems have high spectral efficiency and ability to engage digital signal processing at the receiver side, in order to compensate for the channel impairments. Since different coherent optical communication networks can use various constellations, a constellation conversion is often performed when an optical bit stream reaches a node connecting two optical communication networks, e.g., an optical transport network and a data center.

Currently, this conversion is performed by electrical regeneration which uses a bit-rate restrictive OEO conversion. Consequently, all-optical constellation conversion methods have recently been published introducing conversion from Non-Return to Zero (NRZ) to Return to Zero (RZ) format, NRZ to Binary Phase Shift Keying (BPSK), NRZ to Quadrature Phase Shift Keying (QPSK), On-Off Keying (OOK) to 16 quadrature amplitude-phase modulation (QAM), RZ-OOK to NRZ-QPSK and conversions among M-ary Phase Shift Keying (PSK) modulation formats. However, all prior art solutions failed to provide a generic method for constellation conversion.

It is therefore an object of the present invention to provide a method and system for symbol constellation conversion, which are generic and can convert any given constellation of symbols to any desired constellation.

It is another object of the present invention to provide a method and system for symbol constellation conversion, which are all optical and do not require expensive electronic fast sampling.

It is an additional object of the present invention to provide a system for symbol constellation conversion, which may be implemented on a compact silicon integrated circuit.

Other objects and advantages of the invention will become apparent as the description proceeds.

SUMMARY OF THE INVENTION

The present invention is directed to a method for performing optical constellation conversion, according to which each received symbol from a constellation of input symbols is optically split into M components and each component is multiplied by a first predetermined different complex weighing factor, to achieve M firstly weighted components with different amplitudes. Then a nonlinear processor optically performs a nonlinear transform on each M firstly weighted components, to obtain M outputs which are linearly independent. Finally, a linear processor optically performs a linear transform to obtain a new converted constellation by optically multiplying, in the complex plane, each of the M outputs by a second predetermined different complex weighing factor, to achieve M secondly weighted components and summing the M secondly weighted components.

Both nonlinear and linear transforms may be performed by a neural network, such as single-layer RBFs.

Each input symbol may be transmitted through a different output port by placing each output symbol in a different row of the matrix V, which represents the output of the linear processor.

The second predetermined different complex weighing factor may be estimated by a Least Squares (LS) estimator or by a Minimum Mean Square Error (MMSE) estimator.

The present invention is also directed to a system for optically performing constellation conversion, which comprises:
a) an optical power coupling component for coupling received symbols from an optical fiber carrying optical signals;
b) an optical splitter (such as an M×M coupler) for splitting each received symbol from a constellation of input symbols into M components and multiplying each component by a first predetermined different complex weighing factor, to achieve M firstly weighted components with different amplitudes;
c) a nonlinear optical processor (implemented for example by a saturated Semiconductor Optical Amplifier), for performing a nonlinear transform on each M firstly weighted components, to obtain M outputs which are linearly independent;
d) a linear optical processor for performing a linear transform to obtain a new converted constellation by:
d.1) optically multiplying each of the M outputs by a second predetermined different complex weighing factor, to achieve M secondly weighted components; and
d.2) an optical summation circuitry for summing the secondly weighted components.

The M firstly weighted components with different amplitudes may be determined by a Mach-Zehnder Modulator (MZM) in each output port of the M×M coupler.

The system may further comprise a Local Oscillator (LO), which is coherently added to the nonlinear optical processor to translate phase differences among the symbols of the input constellation to power differences.

The linear optical processor may be implemented by:
a) an Amplitude-Phase Modulator (APM) being an Amplitude Modulator followed by a phase modulator, for receiving each output of the nonlinear optical processor;
b) an M×M coupler for combining the resulting signals to yield M output signals.

Each Optical Amplifier (SOA) may be followed by an optical Band-Pass Filter (BPF) to filter the Amplified Spontaneous Emission (ASE) of the SOA.

DETAILED DESCRIPTION OF PREFERRED EMBODIMENTS

Figure 1:
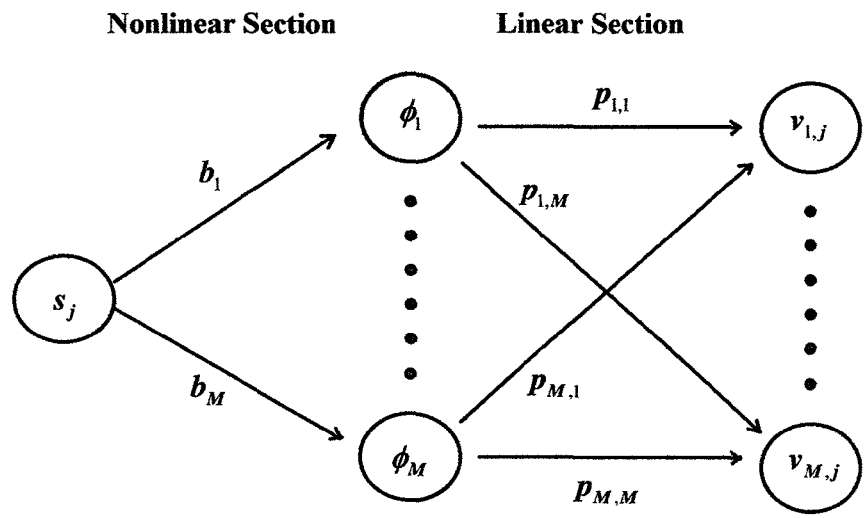
FIG. 1. illustrates a single layer RBF network implementing an M-ary constellation conversion, according to an embodiment of the invention.

The present invention proposes a generic method for all-optical silicon-photonic conversion of amplitude-phase modulation formats in I-Q plane, which is based on the implementation of single-layer, radial basis function neural networks. This method enables all-optical transformation from any input constellation to any desired output constellation in I-Q plane. Since the I-Q plane is two dimensional, the conversion of constellations with more than two symbols must be a nonlinear process in order to independently transform each symbol. The nonlinear process is implemented by an optical single-layer neural network with Radial Basis Functions (RBFs).

A silicon-Photonic Integrated Circuit (PIC) implementing the proposed system is designed in order to achieve small scale and low loss device which can take advantage of the well-established silicon circuitry fabrication technology. The silicon-photonic implementation (i.e., the application of photonic systems which use silicon as an optical medium) offers the possibility of dense optical and electrical silicon circuitry integration. In addition, the proposed PIC is highly reconfigurable, as different constellation conversions can be performed by the same PIC through different combinations of modulators voltages. The proposed system design showed a conversion of a QPSK constellation to the first four symbols of an 8-PSK constellation with an error free output and an Error Vector Magnitude (EVM—a vector in the I-Q plane between the ideal constellation point and the point received by the receiver) of less than 2.5%.

Mathematical Model

Assuming that an M-ary constellation (the M-ary modulation is used to increase the size of the transmitted information by increasing the number M of different symbols) in the I-Q plane is given, with symbols $\{s_j\}_{j=1}^M$ which should be converted to another M-ary constellation with symbols $\{\hat{s}_j\}_{j=1}^M$ in this space. Since the I-Q plane is two-dimensional, a linear transform in this space is defined by setting the transform for two linearly independent vectors. Thus, the linearity of the transform allows determining the conversion of only two symbols independently, out of the other constellation's symbols. Hence, in order to achieve an M×M independent constellation conversion mapping where M>2, the constellation conversion system should be nonlinear.

Neural networks are a type of an existing powerful tool for the construction of nonlinear transforms. These networks use a weighted sum of nonlinear basis functions to achieve a desired target nonlinear function. The weights of the sum and some properties of the basic functions can be adjusted to attain different various target nonlinear functions.

Radial basis functions are functions which depend only in the norm of their input. Using neural networks of single-layer RBFs, universal approximation is attained under the mild conditions given in "Universal approximation using radial basis function networks," J. Park and I. W. Sandberg, Neural Computation, vol. 3, no. 2, pp. 246-257, June 1991 and in "Approximation and radial basis function Networks,". J. Park and I. W. Sandberg, Neural Computation, vol. 5, no. 2, pp. 305-316, March 1993. The problem of transforming a set of distinct data vectors into any desired set of target data vectors by single-layer RBF networks is addressed in "Multivariable functional interpolation and adaptive networks," D. S. Broomhead and D. Lowe, Complex Systems, vol. 2. pp. 321-355, 1988, and provides a mathematical tool for the construction of the constellation conversion system proposed by the present invention.

FIG. 1. illustrates a single layer RBF network (an artificial neural network that uses radial basis functions as activation functions) implementing an M-ary constellation conversion, according to an embodiment of the invention. The first part of the network, placed in the left side of FIG. 1, splits the input symbol $s_j$ to M outputs, where the $i^{th}$ output is multiplied by factor $b_i$. Then, the RBFs $\{\varphi_i(\|x-y_i\|)\}_{i=1}^M$ are applied on the outputs, where x and $y_i$ are the input and the center of the $i^{th}$ RBF, respectively.

The first part of the network is the nonlinear section and its output is signified by the column vector $\vec{u}_j=(u_{1,j}, \ldots, u_{M,j})^T$ where $u_{i,j}=\varphi_i(\|b_i s_j - y_i\|)$. The output of the nonlinear section may also include a statistically independent additive zero-mean noise vector $\vec{n}_j=(n_{1,j}, \ldots, n_{M,j})^T$ which can consist of noise generated at the RBFs, as well as cross terms of the input symbol and statistically independent zero-mean input noise. The second part of the system is the linear section, presented at the right hand side of FIG. 1. It constructs the M outputs of the network by M weighted sums, with weights $\{p_{M}\}_{i,j=1}^{M}$, of the nonlinear section's outputs to yield the output column vector $\vec{v}_j=(v_{1,j}, \ldots, v_{M,j})^T$. The constellation conversion can be achieved by placing the output symbol $\hat{s}_j$ in the desired coordinate of $\hat{v}_j$ and setting the components of the other coordinates to zero.

The RBF single-layer network can be mathematically described as follows. Let us denote the outputs of the nonlinear and linear sections by the matrices $U=\{u_{ij}\}_{i,j=1}^{M}$ and $V=\{v_{ij}\}_{i,j=1}^{M}$, respectively. In this notation, the index i stands for the serial number of the relevant section's output port and the index j represents the serial number of the input symbol which should be converted. Signifying the linear section's weights and the noise at the output of the nonlinear section by P and N, respectively, gives:

$$P(U+N)=V \quad (1)$$

Given the matrices V and U, a matrix P obeying Eq. (1) can be estimated.

If it is desired that the converted constellation will be transmitted through the $i^{th}$ output port of the system, then, all the elements in V should be zero except for those in the $i^{th}$ row. In this row, the $j^{th}$ element should be the desired symbol $\hat{s}_j$ which is attained upon conversion of the input symbol $s_j$. In addition, Eq. (1) implies that the proposed system also allows transmitting each input symbol through a different output port. This can be achieved by placing each output symbol in a different row of V. In cases where the noise is not dominant, a Least Squares (LS) estimator can be used to estimate P. Otherwise, a Minimum Mean Square Error (MMSE) estimator is preferable. In order to find the MMSE estimator, the linear section's matrix P should obey Eq. (2):

$$\operatorname*{argmin}_{p_i} \|p_i^T(U+N) - v_i^T\|^2 \quad i=1, \ldots, M \quad (2)$$

where $p_i^T$ and $v_i^T$ are the $i^{th}$ rows of the linear section's matrices P and V, respectively. In addition, the elements of the noise matrix N are assumed to be statistically independent. Hence, the MMSE estimator is given by:

$$P=[(UU^H+\Gamma_N)^{-1}UV^H]^H \quad (3)$$

where $\Gamma_N = E[NN^H]$ is a diagonal matrix, since the terms of N are zero-mean and statistically independent.

By taking $\Gamma_V=0$, it is possible to obtain the LS estimator for P. Hence, using Eq. (3) the terms of the matrix P can be calculated from the outputs of the nonlinear section, the second order statistics of the noise at the output of the nonlinear section, and the desired output symbols of the constellation conversion system.

Silicon-Photonic Implementation

Figure 2:
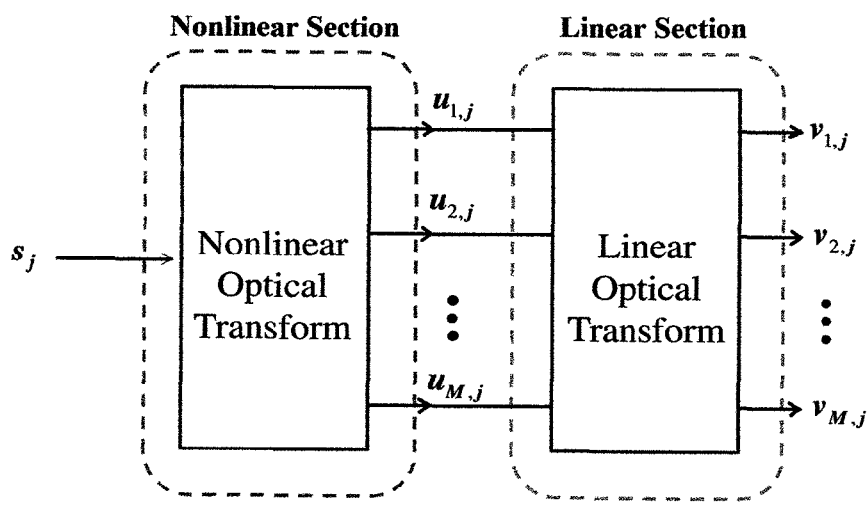
FIG. 2 is a block diagram of the proposed silicon-photonic system, according to the invention.

Silicon-photonics seems to be attractive for the implementation of the described constellation conversion system as it enables to produce a small scale and fully integrated device. FIG. 2 is a block diagram of the proposed silicon-photonic system, according to the invention. As the input symbol $s_j$ enters the system, it is passed through an optical element implementing the nonlinear section of the system, which yields the output vector $\vec{u}_j+\vec{n}_j=(u_{1,j}+n_{1,j}, \ldots, u_{M,j}+n_{M,j})^T$. This vector of signals is processed by a second optical element implementing the matrix P which multiplies $\vec{u}_j+\vec{n}_j$. The output of the linear section is the vector $\vec{v}_j=(v_{1,j}, \ldots, v_{M,j})^T$.

Figure 3:
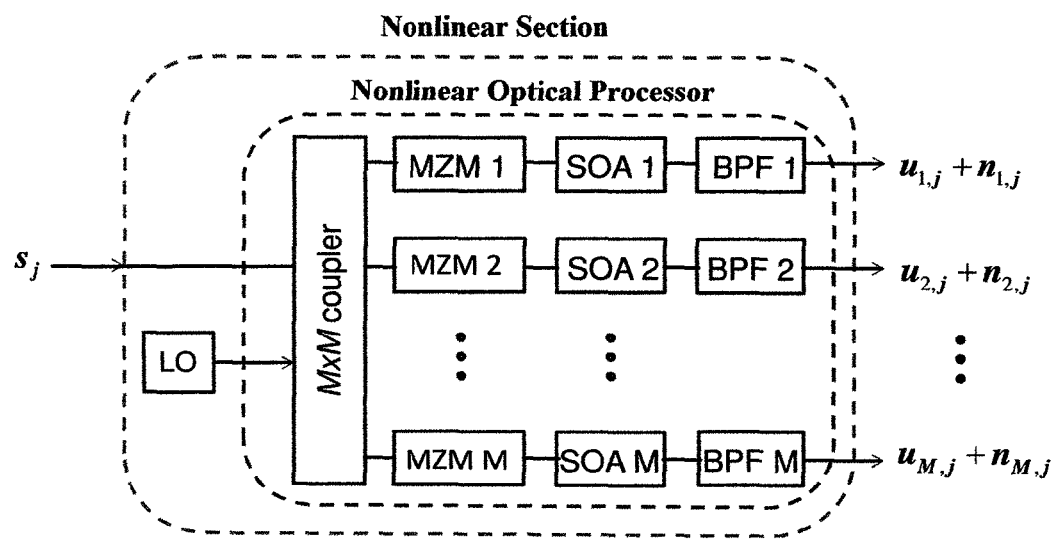
FIG. 3 illustrates a possible silicon-photonic design for the nonlinear section of the system proposed by the present invention.

FIG. 3 illustrates a possible silicon-photonic design for the nonlinear section of the system proposed by the present invention. The input signal corresponding to the input symbol $s_j$ is assumed to have compensated Chromatic Dispersion (CD) and Polarization Mode Dispersion (PMD). In addition, it is assumed to be pre-amplified to compensate for the losses accumulated during its propagation in the optical communication network.

In order to enter the nonlinear section of the system, the signal is coupled from the optical fiber to the silicon chip using a taper or a grating coupler. Then, the input symbol $s_j$ reaches the nonlinear optical processor. The symbol is split and multiplied by various factors $\{b_j\}_{j=1}^{M}$ implemented by an M×M coupler having a Mach-Zehnder Modulator (MZM) in each one of its output ports. A Local Oscillator (LO) is also connected to the nonlinear optical processor. It is coherently added to the signal through another input of the M×M coupler.

If the transfer matrix of the coupler, the MZMs' attenuations, and the LO's phasor are given by $C=\{c_{i,j}\}_{k,i=1}^{M}$, $\vec{\rho}=(\rho_1, \ldots, \rho_M)$, and $s_{LO}$, respectively, the signal following the MZM of the $i^{th}$ coupler's port is $b_i s_j - y_i$ where $y_i = -\hat{b}_i s_{LO}$. The $b_i$ parameter is the transmission coefficient of the input optical symbol $s_j$ from the system's input to the output of the MZM located at the $i^{th}$ output port of the nonlinear section. Assuming that $s_j$ enters the $k^{th}$ input port of the nonlinear section's MMI coupler, $b_i=c_{k,i}\rho_i$ where $c_{k,i}$ is the transmission coefficient from the $k^{th}$ input port to the $i^{th}$ output port of a Multi-Mode Interference (MMI) coupler, and $\rho_i$ is the attenuation of the $i^{th}$ MZM. Similarly, the $\vec{b}_i=c_{k,i}\rho_i$ is the transmission coefficient of the LO from the $l^{th}$ input port of the MMI coupler to the output of the MZM located at the $i^{th}$ port of the nonlinear section. The LO and MZMs are tuned such that $\|b_i s_j - y_i\|$ is different for each i and j.

The M×M coupler can be implemented by a MMI coupler and silicon-photonic MZMs have been extensively researched and demonstrated. There is no need for high speed MZMs as their attenuation remains constant along the transmitted symbol sequence. Hence, a silicon-photonic design to attain the terms $\{b_i s_j - y_i\}_{i=1}^{M}$ of the constellation translation neural network is obtained.

In order to complete the nonlinear section's design, a silicon-photonic implementation of the RBFs is required. A saturated Semiconductor Optical Amplifier (SOA) can be suitable due to its high nonlinearity, small scale, and the possibility of integration in silicon on insulator (SOI) chip. The SOA should be designed to have a short carrier lifetime to avoid distortion of short input pulses due to long gain recovery time. Many techniques have been developed to achieve short gain recovery time such as Amplified Spontaneous Emission (ASE) enhancement, quantum well doping, and usage of a holding beam. Finally, each SOA in the nonlinear section is followed by an optical Band-Pass Filter (BPF) to filter its ASE. The SOA's output for an input signal x(t) can be written as $e^{j \cdot \arg(x(t))} g(\|x(t)\|)$ where $\arg(x(t))$ is the phase of x(t), which apparently implies that the SOA cannot implement an RBF as its output depends on the input signal's phase. However, since in the proposed design each input symbol $s_j$ results in different input power at the SOA, the output phase of the SOA can be considered as a function of the SOA's input power. Thus, the signal at the $i^{th}$ output port of the nonlinear section is given by:

$$u_{i,j} = \varphi_i(\|b_i s_j - y_i\|)$$

which means that the SOA realizes an RBF.

Figures 4A, 4B:
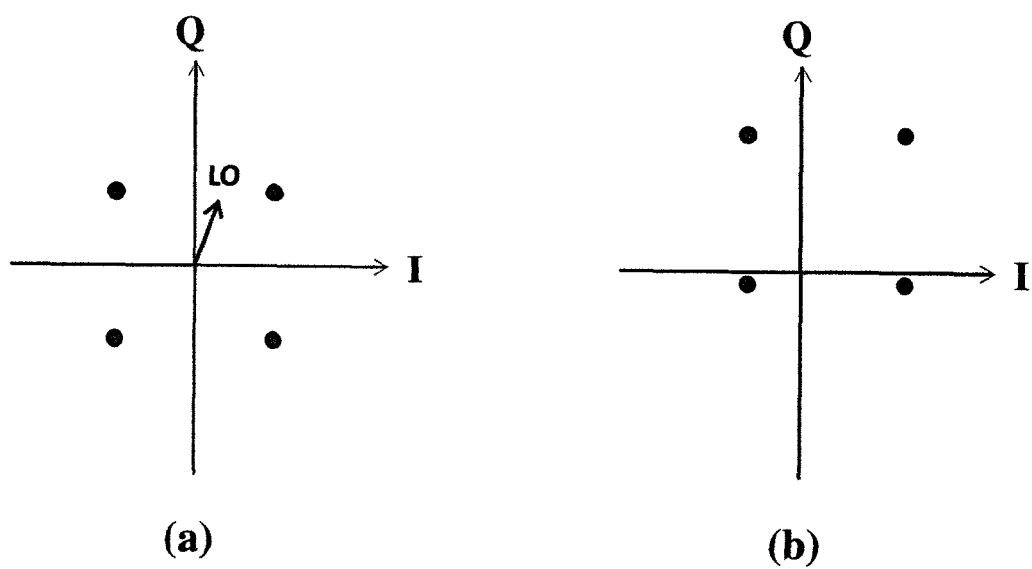
FIG. 4a shows a local oscillator and QPSK constellation.
FIG. 4b shows the local oscillator coherently added to QPSK constellation, resulting in power differences among the various symbols.

The coherent addition of the LO to the input symbol $s_j$ is needed in order to translate phase differences among the symbols of the input constellation to power differences, as shown in FIGS. 4a and 4b, for QPSK constellation. FIG. 4a shows a local oscillator and QPSK constellation. FIG. 4b shows the local oscillator coherently added to QPSK constellation, resulting in power differences among the various symbols.

In input constellations where some symbols are distinguished only in their phase, the LO is necessary to have a nonsingular matrix U. Adding the LO coherently, the input power to each SOA is different for every input symbol. As a result, the columns of the nonlinear section's matrix U are linearly independent due to the nonlinear response of the SOAs.

Having the vector $\vec{u}_j + \vec{n}_j$ at the output of the nonlinear section, the linear section should be applied to transform it to the desired output vector $\vec{v}_j$. As described earlier, the linear section realizes a multiplication of the column vector $\vec{u}_j + \vec{n}_j$ by a matrix P.

Figure 5:
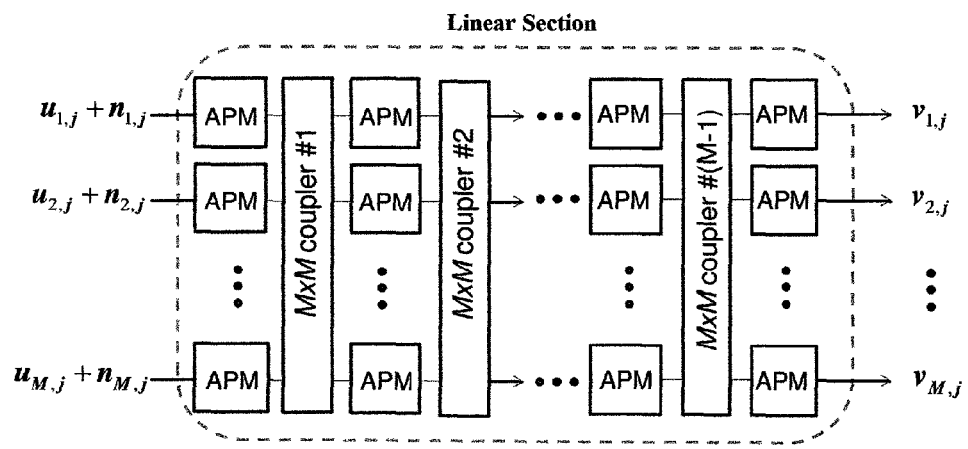
FIG. 5 illustrates a possible implementation of the linear section where the elements of P are adjustable, according to an embodiment of the invention.

FIG. 5 illustrates a possible implementation of the linear section where the elements of P are adjustable, according to an embodiment of the invention. Each output of the nonlinear section is passed through an APM (an amplitude modulator followed by a phase modulator). The resulting signals are subsequently combined by an M×M coupler to yield M output signals. These output signals are passed through another set of amplitude and phase modulators and then combined by an M×M coupler. The process of modulation and coupling is performed M−1 times and finally, the outputs of the last M×M coupler are passed through another set of amplitude and phase modulators. Therefore, the output of the linear section can be described as:

$$P = A_M C A_{M-1} C A_{M-2} \ldots C A_1 \quad (4)$$

where $A_n = \text{diag}(\alpha_{1,n} e^{j\varphi_{1,n}}, \ldots, \alpha_{M,n} e^{j\varphi_{M,n}})$ represents the $n^{th}$ set of amplitude and phase modulators and $C = \{c_{k,j}\}_{i,j=1}^{M}$ is the above mentioned transfer matrix of the M×M coupler. Since the terms $\{\alpha_{i,j}\}_{k,i=1}^{M}$ and $\{\varphi_{i,j}\}_{k,i=1}^{M}$ can be arbitrarily determined by tuning the amplitude and phase modulators of the linear section, the terms of P are accomplished by solving a set of $M^2$ nonlinear coupled complex equations. These complex equations have $M^2$ unknowns, which are the values of the terms $\{\alpha_{i,j} \cdot \exp(j\varphi_{k,i})\}_{k,i=1}^{M}$. Hence, the fact that there are $M^2$ couples of amplitude and phase modulators gives $M^2$ degrees of freedom in setting the value of the matrix P. Solving the nonlinear coupled equations, the values of the amplitude and phase modulators are set by the terms $\{\alpha_{i,j}\}_{k,i=1}^{M}$ and $\{\varphi_{i,j}\}_{k,i=1}^{M}$, respectively, and the matrix P is achieved.

As in the nonlinear section, using silicon-photonic amplitude and phase modulators and M×M MMI couplers, the linear section of the system can be implemented as a silicon-photonic device and integrated with the nonlinear section of the system. It should be noted that since the values of the amplitude and phase modulators and the currents of the SOAs are tunable, the proposed system is highly reconfigurable.

Figure 6A:
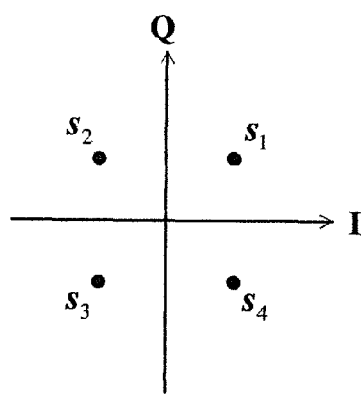
FIGS. 6a-6b illustrate the input and output constellation in I-Q plane.
Figure 6B:
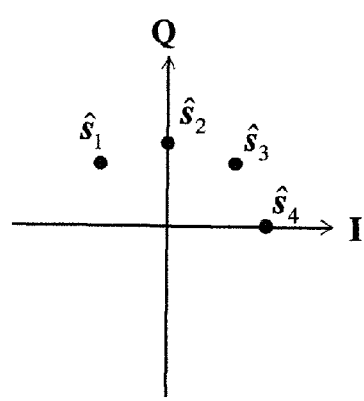

FIGS. 6a-6b illustrate the input and output constellations in I-Q plane, where FIG. 6a shows an input QPSK constellation and FIG. 6b shows a desired output constellation, which consists of the 4 first symbols of 8-PSK constellation. The simulated system is an M=4 constellation converter. It was configured to convert a 3 mW QPSK input constellation, transmitted in a 40 Gbaud NRZ format, to the first 4 symbols of a 1 mW 8-PSK constellation (i.e., the symbols with phases of 0°, 45°, 90°, and 135°), with the same 40 Gbaud NRZ format. The pulses of the input and output constellations had raised cosine amplitude with roll-off factor (a measure of the excess bandwidth of the filter) of α=0.1. In addition, the two constellations had wavelength of 1550 nm and Transverse Electric (TE) polarization. The output symbols were transmitted through output port 1 of the system.

Using another such converter with phase shift of 180°, two QPSK constellations can be translated to one 8-PSK constellation. The CD, PMD, and propagation loss of the input constellation are assumed to be compensated, such that the SOAs at the nonlinear section of the system operate in nonlinear regime. Since all the symbols of the input constellation are assumed to have the same a-priori probability, the mapping from the input to the output constellation can be chosen by the designer. Hence, there are 4! possible mappings, and the one yielding the best performance can be chosen. The quality of constellation conversion was measured by the EVM, Symbol Error Rate (SER), and the extinction ratio of the signals at the output ports of the system.

Figure 7:
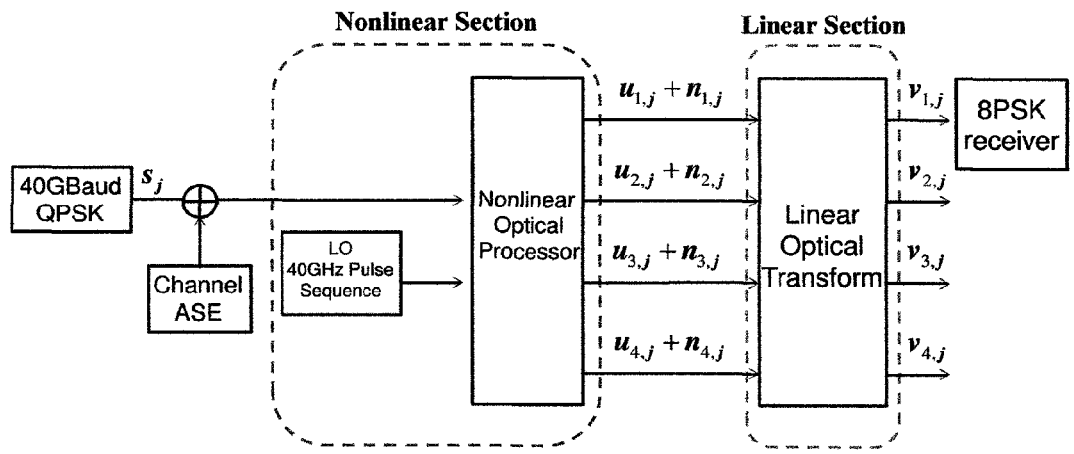
FIG. 7 is a block diagram of a four symbol constellation converter, according to an embodiment of the invention.

FIG. 7 is a block diagram of four symbol constellation converter, according to an embodiment of the invention. The transmitted QPSK input pulse sequence had a 1 nm bandwidth additive ASE noise centered at 1550 nm wavelength, which simulated the channel's noise. The power and phase of the LO were 7.3 mW and −3.2°, respectively. It was implemented by a 40 GHz raised cosine pulse sequence with α=0.1, which was synchronized to the input QPSK pulse sequence. The shaping and synchronization of the LO were performed in order to have the same raised cosine shape for the pulses at the system's output. The nonlinear section had four outputs which yielded the vector of signals $\vec{u} + \vec{n}$. The linear section transformed the nonlinear section's outputs to the four dimensional vector of signals $\vec{v}$, where the output signal of port 1 was processed by an 8-PSK receiver. The simulation's variables were the (Optical Signal-to-Noise Ratio) OSNR of the input pulse sequence, the phase locking error of the LO, and the extinction ratio of the linear section's MZMs.

Figure 8:
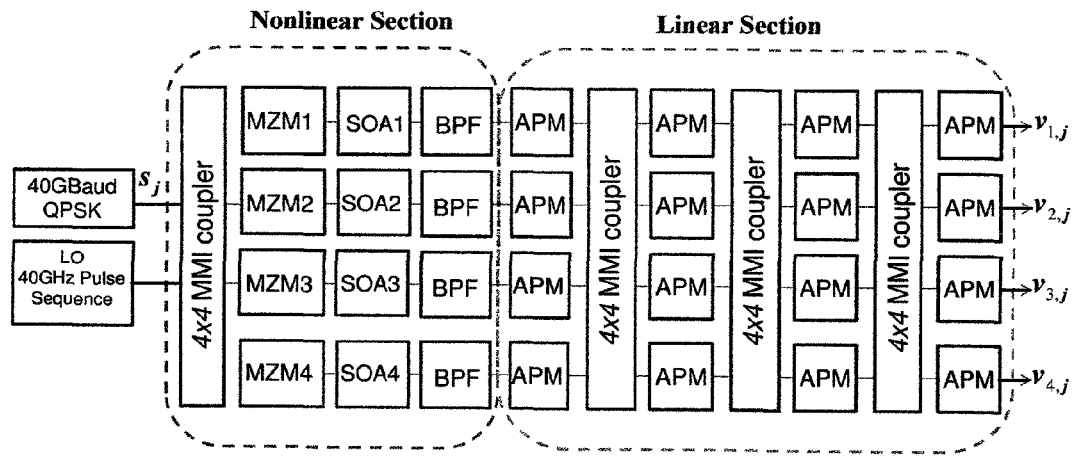
FIG. 8 illustrates the implementation of a four symbol constellation converter.

FIG. 8 illustrates the implementation of a four symbol constellation converter. As the input symbol $s_j$ arrives at the nonlinear section, it enters the first 4×4 MMI coupler where it is coherently added to the LO. The simulated input OSNRs of the symbol were 25 and 30 dB. It should be noted that the phases of the input symbol and the LO are different in each of the coupler's output ports. Hence, each output port yields a different coherent addition of $s_j$ and the LO. The power and phase of the LO were set to the above mentioned values in order to maximize the minimal power ratio among the first 4×4 MMI coupler's outputs, while keeping the minimal output power at the MMI coupler's output high enough to have high OSNR at the outputs if the SOAs. The simulated phase locking errors were 0°-6°. Then, each output signal of the MMI coupler was passed through an MZM. The attenuations of MZM1 and MZM2 were 6.7 dB while the attenuation of MZM3 and MZM4 were tuned to zero in order have different input power in each SOA. This way, the rows of the nonlinear section's matrix U are promised to be linearly independent since the SOAs had a nonlinear response and each SOA had a different input power.

Since the SOAs were saturated, the proposed system was nonlinear. As described before, this is necessary for constellation conversion of more than two symbols in the I-Q plane. The SOAs were followed by BPFs having a 1 nm bandwidth to filter the ASE. The signals after the BPFs are the outputs of the nonlinear section.

The 4×4 MMI coupler was symmetrical and its parameters are given in Table 1. Its excess loss and imbalance were 0.15 dB and 0.0627 dB, respectively. The coupler's transfer matrix was:

$$C = \begin{pmatrix} 0.491e^{-j0.675\pi} & 0.492e^{j0.076\pi} & 0.492e^{-j0.927\pi} & 0.493e^{-j0.674\pi} \\ 0.492e^{j0.076\pi} & 0.493e^{-j0.675\pi} & 0.495e^{-j0.680\pi} & 0.492e^{-j0.927\pi} \\ 0.492e^{-j0.927\pi} & 0.495e^{-j0.680\pi} & 0.493e^{-j0.676\pi} & 0.492e^{-j0.076\pi} \\ 0.493e^{-j0.674\pi} & 0.492e^{-j0.0927\pi} & 0.492e^{j0.076\pi} & 0.491e^{-j0.674\pi} \end{pmatrix} \quad (5)$$

TABLE 1

4 × 4 MMI coupler parameters

| Parameter | Value [μm] | Description |
|---|---|---|
| H | 0.5 | Silicon layer thickness |
| D | 0.3 | Etching depth |
| $L_{MMI}$ | 844 | Multimode region length |
| $W_{MMI}$ | 20 | Multimode region width |
| $W_A$ | 2.5 | Access waveguide width |
| $W_t$ | 0.4 | Interconnecting waveguide width |
| $L_T$ | 30 | Taper length |
| s | 5 | Waveguides separation |

Figure 9:
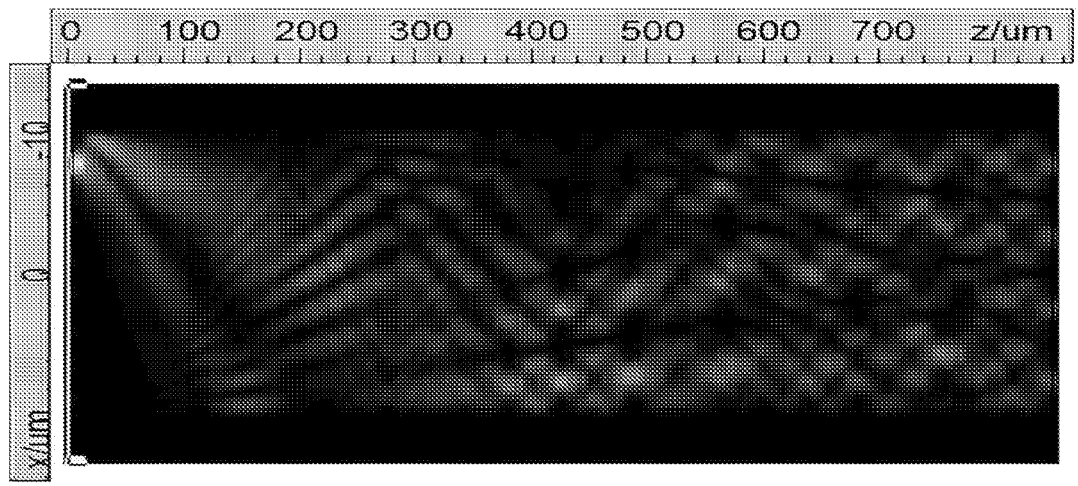
FIG. 9 illustrates a normalized intensity of a wave propagating in the multimode region of the 4×4 MIMI coupler upon transmission from the upper port.

FIG. 9 illustrates a normalized intensity of a wave propagating in the multimode region of the 4×4 MMI coupler upon transmission from the upper port. High intensities tend to white and low intensities have a black color.

SOA1 and SOA2 had a drive current of 400 mA whereas 500 mA current was used for SOA3 and SOA4. A lower drive current was used for SOA1 and SOA2 in order to have high OSNR at their outputs since their input power is lower due to the attenuation of MZM1 and MZM2.

Figure 10A:
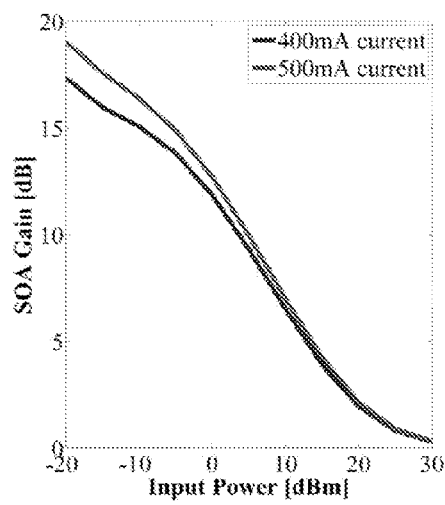
FIGS. 10a and 10b show the gain and additive phase of the SOAs as a function of CW input power for different currents, respectively.
Figure 10B:
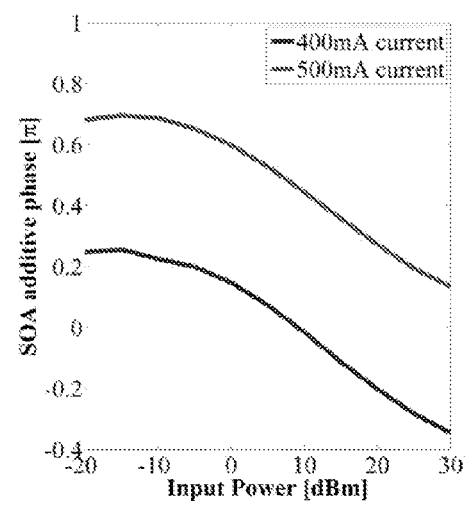

FIGS. 10a and 10b show the gain and additive phase of the SOAs as a function of CW input power for different currents, respectively. The noise figure of all the SOAs was 9.5 dB for a 1 mW CW input power.

The acquisition of the nonlinear section's modulators values was performed by training the neural network, which was conducted as follows. A pulse sequence with $10^4$ pulses was transmitted with the LO being perfectly locked, and the matrices U and $\Gamma_N$ were subsequently derived from the output of the nonlinear section. Since all the output symbols were transmitted from port 1 of the system, all the elements of the matrix V were zero, except for the four elements of the first row where the values of the desired first four 8-PSK symbols were substituted. The matrix P was derived from Eq. (3) and the corresponding values of the linear section's MZMs and phase modulators were subsequently calculated from Eq. (4). The extinction ratio of the linear section's MZMs was in the range of 15-30 dB and the phase modulators had the same parameters as those of the MZMs' arm. Hence, the quantization of the MZMs and the phase modulators voltages values was derived from the MZMs' extinction ratio. The value of the modulators calculated from Eq. (4) were accordingly quantized and substituted into the simulation to set the linear section.

The 8-PSK receiver was composed of the filter F(t) and a hard decision circuit to yield the output symbols. F(t) was matched to the amplitude of the desired output 1 mW raised cosine pulse and normalized by its power. The thermal noise and shot-noise of the receiver were neglected due to the dominance of the ASE noise.

Figure 11:
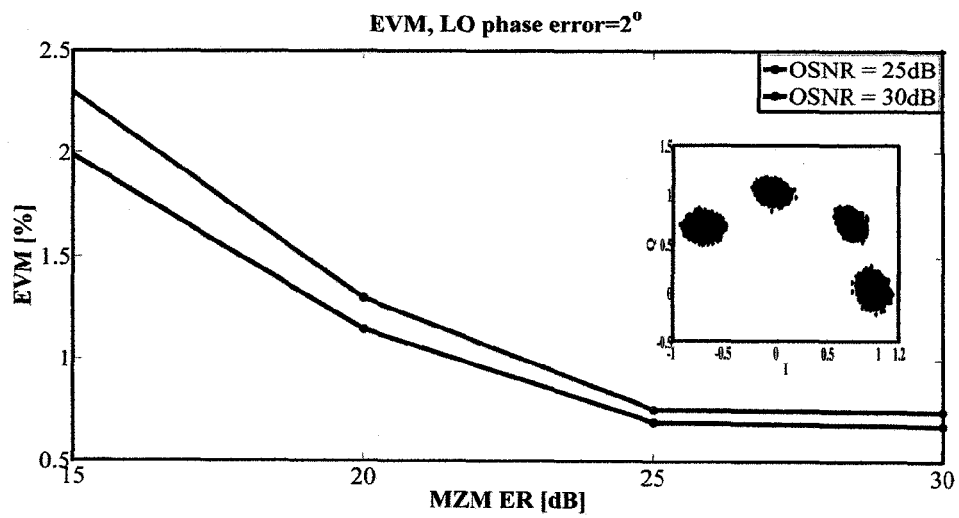
FIG. 11 shows the EVM of the signal measured in output port 1 versus the linear section's MZMs extinction ratio (ER) for a $10^5$ input pulse sequence.

FIG. 11 shows the EVM of the signal measured in output port 1 versus the linear section's MZMs Extinction Ratio (ER—the ratio of two optical power levels of a digital signal generated by an optical source) for a $10^5$ input pulse sequence. Input OSNRs of 25 and 30 dB were simulated, the phase locking error of the LO was 2°, and the extinction ratio of the linear section's MZMs varied from 15 to 30 dB in 5 dB resolution. The EVM is lower than 2.5% for all OSNRs and MZM ER values. The low EVM shows that the nonlinear transform implemented by the proposed silicon-photonic neural network keeps the transmitted symbols clustered around their ideal noiseless values. FIG. 11 also shows that the influence of the quantization errors of linear section's modulators is negligible when the MZM ER is larger than 25 dB. The inset illustrates the constellation diagram of a converted constellation for 25 dB input OSNR, 2° LO phase error, and 15 dB MZMs ER. The clustering of the output symbols around the ideal first four 8-PSK constellation symbols is clearly seen. Desired and output symbols are in red and blue, respectively.

The SER corresponding to the presented EVM was error free. The extinction ratio of the signals at the system's output was defined as the ratio between the power in output port 1 and the power of the signals in output ports 2-4.

Figure 12:
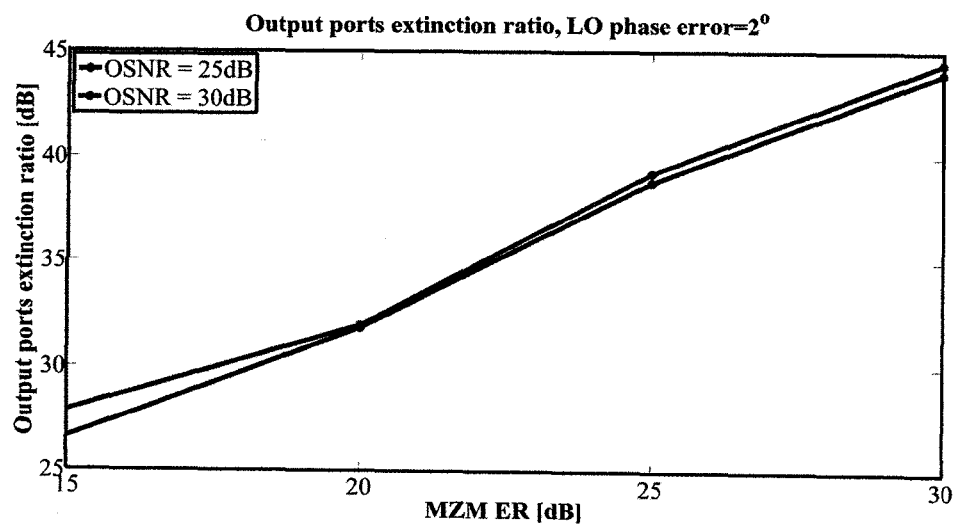
FIG. 12 shows the extinction ratio at the system's output ports.

FIG. 12 shows the extinction ratio at the system's output ports. The output extinction ratio increases for higher MZM ER. In addition, 15 dB MZM ER is sufficient to have 25 dB output extinction ratio, such that more than 99% of the output power is transmitted from output port 1.

Figure 13:
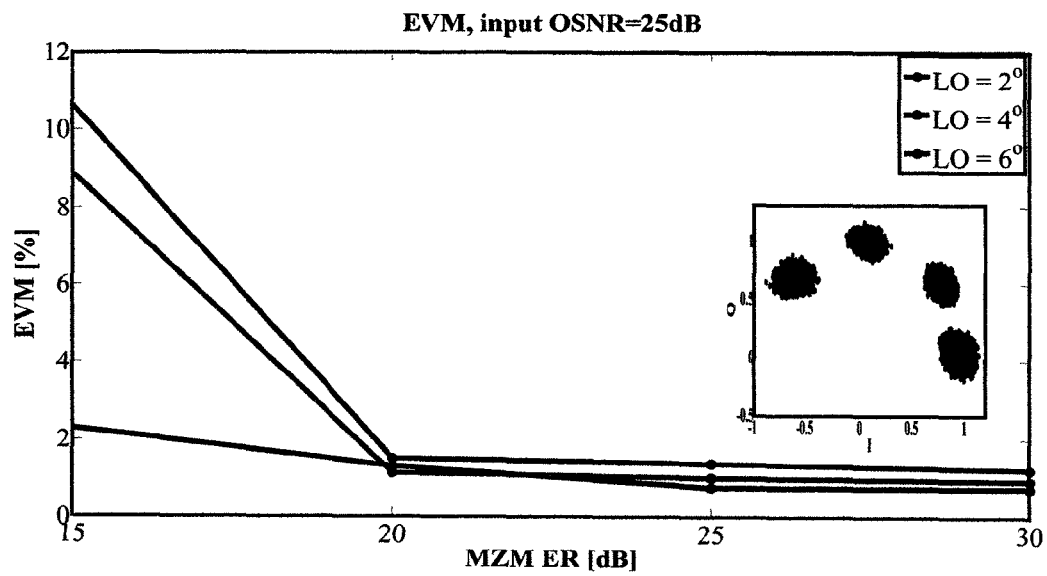
FIG. 13 shows the EVM versus MZM ER for three LO phase locking errors, and OSNR of 25 dB.

FIG. 13 shows the EVM versus MZM ER for three LO phase locking errors, and OSNR of 25 dB. The $10^5$ input pulse sequence was converted and transmitted from output port 1 of the system. This figure presents EVM lower than 1.5% for all LO phase locking errors starting from MZMs ER of 20 dB, respectively. Similarly to FIG. 11, the quantization errors of the linear section's modulators have negligible effect on the EVM when the MZM ER is larger than 25 dB. The constellation diagram at the inset of FIG. 13 for the case of 25 dB input OSNR, 4° LO phase error, and 15 dB MZMs ER, shows that the output constellation is highly clustered. However, the ideal 8-PSK pulses are not in the middle of the received symbols clusters, which results in higher EVM than the one achieved case of 2° phase locking error. Desired and output symbols are in red and blue, respectively.

Figure 14:
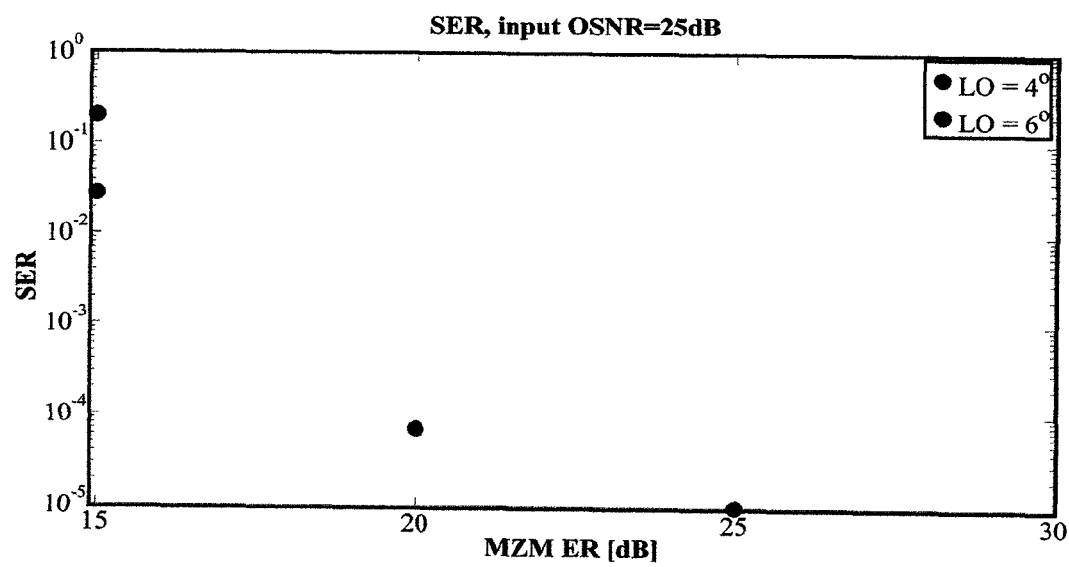
FIG. 14 shows the SER versus the MZM ER for a 25 dB OSNR.
Figure 15:
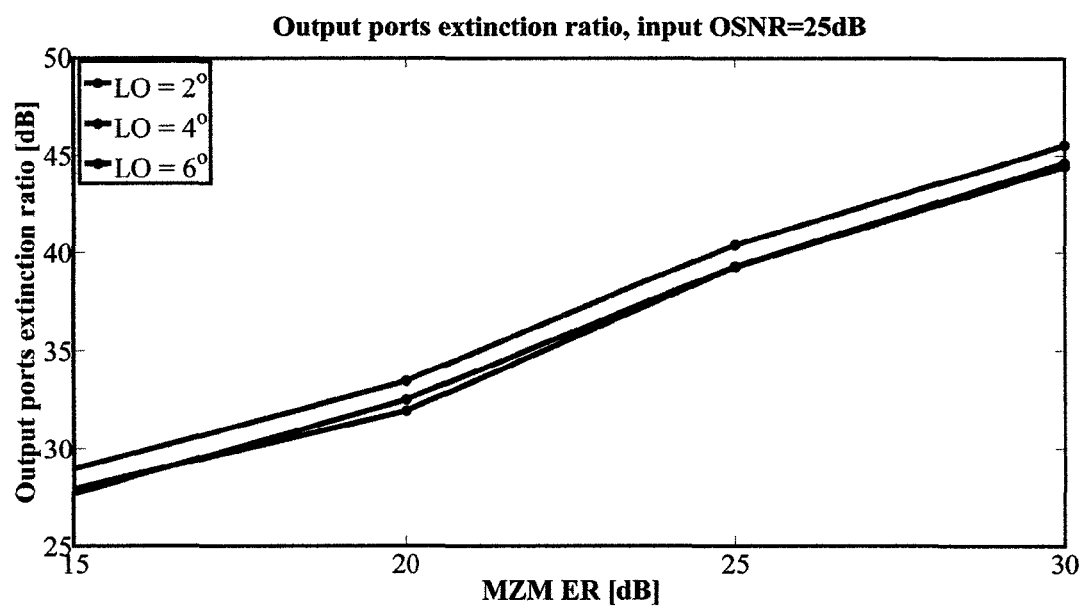
FIG. 15 shows the corresponding output extinction ratio of the system for different LO phase errors, with input OSNR is 25 dB.

FIG. 14 shows the SER versus the MZM ER for a 25 dB OSNR. For 4° phase locking error the MZM ER should be higher than 15 dB to attain error free transmission, while 20 dB MZM ER is required to get SER lower than $10^{-3}$ when the phase locking error is 6°. The 2° LO phase error yielded error free transmission. FIG. 15 shows the corresponding output extinction ratio of the system for different LO phase errors, with input OSNR is 25 dB.

The simulation results show that for the above scenario of transforming a QPSK constellation to the first four symbols of an 8-PSK constellation, high performance constellation conversion is achieved. The system's performance is analyzed versus the noise level and phase alignment of the LO. The noise in the system is dominated by the OSNR of the input pulse sequence, the phase locking error of the LO, the ASE generated in the SOAs, and the quantization errors of the modulators in the linear section which stem from their limited extinction ratio. The first three noise sources influence the OSNR at the output of both the nonlinear and the linear sections, while the quantization errors only affect the OSNR at the output of the linear section. It should be noted that the term $(UU^H+\Gamma N)^{-1}$ in Eq. (3) increases as $\Gamma_N$ decreases. Hence, the elements of P are set such that higher weight is given to the output ports of the nonlinear section which have higher OSNR.

The proposed all optical silicon photonic method can be compared to electrical constellation conversion both in the simplicity of implementation and in quality of performance. Electrical constellation conversion requires the employment of a wideband balanced receiver with high-speed photodiodes, analog to digital converters, and a digital signal processing unit. In addition, a high data rate transmitter is needed, having high-speed digital to analog converters, narrow linewidth laser, and fast MZMs to generate the output data pulse sequence with the converted constellation. Using the proposed all-optical silicon photonic implementation, the constellation conversion is performed without detecting and re-transmitting the signal. As noted above, low-speed silicon-photonic modulators can be used, as their driving voltages are updated only upon training of the neural network. On the other hand, using the proposed all-optical solution, the input symbols should be pre-amplified so the SOAs will operate in nonlinear regime. Comparing the performance of the two methods, electrical constellation conversion requires about 23.5 dB/0.1 nm OSNR for $10^{-3}$ BER in case of 28 Gbaud 16 QAM transmission. Hence, for 8-PSK constellation at 40 Gbaud 23 dB/0.1 nm OSNR is required. Here, the simulation of the proposed all-optical silicon photonic system showed that 24 dB/0.1 nm OSNR is required for $10^{-3}$ BER in case of 40 Gbaud 8-PSK output constellation.

The EVM and SER results show that the phase locking error of the LO is more significant than the input OSNR for the system's performance. This results from the strong influence of the LO's phase on the output of the nonlinear section as it considerably affects the input power and phase of the signals at the SOAs' inputs. Hence, the nonlinear section's output matrix U is distorted when a phase locking error occurs, and consequently the required linear section's modulators values may significantly differ from those derived during the training of the system. On the other hand, the influence of the input OSNR is less dominant; it does not affect the average power and phase of the signals at the inputs of the SOAs, thus resulting in a weaker influence on U.

Eq. (1) implies that the condition number (used to measure how sensitive a function is to changes or errors in the input) of the nonlinear section's matrix U affects the OSNR at the system's output. A matrix U with lower condition number results in lower enhancement of the noise entering the linear section and the quantization error noise. To have a low condition number, the rows of U should be linearly independent. Thus, the condition number of U decreases as the response of the SOAs is more nonlinear, since a small difference in the input power of each SOA is ample to get a considerable change in its gain and additive phase. However, highly nonlinear SOAs usually require large drive currents, which result in high ASE. Hence, there is a tradeoff between the system's nonlinearity and the power of the ASE generated in the nonlinear section. In addition, highly nonlinear SOAs tend to distort the amplitude and phase of the amplified signal as the input power required for saturation is inversely proportional to the carrier lifetime. Since longer carrier lifetime corresponds to longer gain recovery time, pulses with larger pulse width should be used to avoid distortion. Hence, there is a tradeoff between the system's nonlinearity and the transmission rate. However, it should be noted that the high transmission rates can be achieved, since the carrier lifetime in commercial SOAs can reach 10 psec.

Another requirement in order to have a well-conditioned U is that the attenuations of the nonlinear section's MZMs should be chosen such that for each symbol, the power ratio among the different SOAs inputs is as large as possible. On the other hand, the attenuation should not be too large in order to have high OSNR at the output of the nonlinear section.

In order to use the nonlinearity of the SOAs, it is important that different input symbols result in significantly different power at the output of the nonlinear section's M×M coupler shown in FIG. 8. Hence, as noted before, the coherent addition of the LO to the input symbol $s_j$ is needed in order to translate phase differences among symbols to power differences. Thus, coherent addition of the LO decreases the condition number of the matrix U, since it causes its columns to be linearly dependent.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for performing optical constellation conversion, comprising:
   a) optically splitting each received symbol from a constellation of input symbols into M components and multiplying each component by a first predetermined different complex weighing factor, to achieve M firstly weighted components with different amplitudes;
   b) optically performing, by a nonlinear processor, a nonlinear transform on each M firstly weighted components, to obtain M outputs which are linearly independent;
   c) optically performing by a linear processor, a linear transform to obtain a new converted constellation by:
      c.1) optically multiplying, in the complex plane, each of said M outputs by a second predetermined different complex weighing factor, to achieve M secondly weighted components; and
      c.2) summing said M secondly weighted components.

2. A method according to claim 1, wherein both nonlinear and linear transforms are performed by a neural network.

3. A method according to claim 1, wherein the neural network is of single-layer RBFs.

4. A method according to claim 1, wherein each input symbol is transmitted through a different output port by placing each output symbol in a different row of the matrix V representing the output of the linear section.

5. A method according to claim 1, wherein the second predetermined different complex weighing factor is estimated by a Least Squares (LS) estimator or by a Minimum Mean Square Error (MMSE) estimator.

6. A system for optically performing constellation conversion, comprising:
   a) an optical power coupling component for coupling received symbols from an optical fiber carrying optical signals;
   b) an optical splitter for splitting each received symbol from a constellation of input symbols into M components and multiplying each component by a first predetermined different complex weighing factor, to achieve M firstly weighted components with different amplitudes;
   c) a nonlinear optical processor for performing a nonlinear transform on each M firstly weighted components, to obtain M outputs which are linearly independent;
   d) a linear optical processor for performing a linear transform to obtain a new converted constellation by:
      d.1) optically multiplying each of said M outputs by a second predetermined different complex weighing factor, to achieve M secondly weighted components; and
      d.2) an optical summation circuitry for summing said secondly weighted components.

7. A system according to claim 6, in which the optical splitter in an M×M coupler.

8. A system according to claim 6, in which the M firstly weighted components with different amplitudes are determined by a Mach-Zehnder Modulator (MZM) in each output port of said M×M coupler.

9. A system according to claim 6, further comprising a Local Oscillator (LO), which is coherently added to the nonlinear optical processor to translate phase differences among the symbols of the input constellation to power differences.

10. A system according to claim 6, in which the nonlinear optical processor is implemented by a saturated Semiconductor Optical Amplifier (SOA).

11. A system according to claim 6, in which the linear optical processor is implemented by:
   a) an Amplitude-Phase Modulator (APM) being an Amplitude Modulator followed by a phase modulator, for receiving each output of the nonlinear optical processor;
   b) an M×M coupler for combining the resulting signals to yield M output signals.

12. A system according to claim 10, in which each Optical Amplifier (SOA) is followed by an optical Band-Pass Filter (BPF) to filter the Amplified Spontaneous Emission (ASE) of said SOA.

* * * * *